(12) United States Patent
Tchakarov et al.

(10) Patent No.: US 7,716,978 B2
(45) Date of Patent: May 18, 2010

(54) HIGH RESOLUTION CAPACITANCE HIGH CONDUCTIVITY FLUID SENSOR

(75) Inventors: Borislav J. Tchakarov, Humble, TX (US); Peter W. Reittinger, Katy, TX (US); Francisco Galvan-Sanchez, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 217 days.

(21) Appl. No.: 11/924,940

(22) Filed: Oct. 26, 2007

(65) Prior Publication Data

US 2009/0107666 A1    Apr. 30, 2009

(51) Int. Cl.
*E21B 47/00* (2006.01)
*G01V 3/18* (2006.01)

(52) U.S. Cl. .................. 73/152.18; 324/324; 73/152.02
(58) Field of Classification Search .............. 73/152.02, 73/152.18; 324/324, 338, 341, 639
See application file for complete search history.

(56) References Cited

U.S. PATENT DOCUMENTS

| | | | |
|---|---|---|---|
| 3,729,994 A | 5/1973 | Klug | |
| 4,219,776 A | 8/1980 | Arulanandan | |
| 4,733,560 A | 3/1988 | Dam | |
| 4,801,863 A | 1/1989 | Schimion et al. | |
| 5,103,181 A * | 4/1992 | Gaisford et al. | 324/637 |
| 5,182,545 A * | 1/1993 | Goekler et al. | 340/620 |
| 5,341,100 A * | 8/1994 | Taylor | 324/341 |
| 5,417,107 A | 5/1995 | Biencourt et al. | |
| 5,677,631 A | 10/1997 | Reittinger et al. | |
| 5,756,899 A | 5/1998 | Ugai et al. | |
| 5,760,310 A | 6/1998 | Rud, Jr. et al. | |
| 6,057,687 A | 5/2000 | Mercer | |
| 6,098,523 A | 8/2000 | Warburton | |
| 6,272,906 B1 | 8/2001 | Fleury et al. | |
| 6,272,915 B1 | 8/2001 | Kostelnicek et al. | |
| 6,441,625 B1 * | 8/2002 | McAllister et al. | 324/691 |
| 6,484,585 B1 | 11/2002 | Sittler et al. | |
| 6,498,500 B1 | 12/2002 | Upton | |
| 6,515,490 B1 | 2/2003 | Upton | |
| 6,516,672 B2 | 2/2003 | Wang | |
| 6,707,307 B1 | 3/2004 | McFarlane et al. | |
| 6,755,247 B2 | 6/2004 | Moake et al. | |
| 7,134,323 B1 | 11/2006 | Discenzo | |
| 2007/0044572 A1 | 3/2007 | Davis et al. | |
| 2007/0046290 A1 | 3/2007 | Bespalov et al. | |

FOREIGN PATENT DOCUMENTS

WO    2007009097 A1    1/2007

* cited by examiner

*Primary Examiner*—John Fitzgerald
(74) *Attorney, Agent, or Firm*—Cantor Colburn LLP

(57) ABSTRACT

In a method and apparatus for estimating a downhole fluid parameter include a body having an elongated cavity defined by an electrically conductive inner surface, an central electrical conductor located coaxially within the cavity, wherein an annular region is defined by the cavity inner surface and an outer surface of the electrical conductor. A fluid is conveyed to the annular region. A first electrode is coupled to the central electrode, a second electrode coupled to the central electrode, and at least one intermediate electrode coupled to the central electrode between the first electrode and the second electrode. An input signal is applied to the central electrode and first and second output signals are emitted from the second electrode intermediate electrode. The output signals are used in part to estimate the fluid property of the fluid existing in the annular region.

21 Claims, 3 Drawing Sheets

HIGH RESOLUTION CAPACITANCE HIGH CONDUCTIVITY FLUID SENSOR

BACKGROUND

1. Technical Field

The present disclosure generally relates to well bore tools and in particular to methods and apparatus for estimating fluid properties downhole.

2. Background Information

Oil and gas wells have been drilled at depths ranging from a few thousand feet to as deep as 5 miles. Wireline and drilling tools often incorporate various sensors, instruments and control devices in order to carry out any number of downhole operations. These operations may include formation testing, fluid analysis, and tool monitoring and control.

Formation testing may include any number of evaluations and estimations. In some cases, it is desirable to understand fluid content for formation fluids produced from a subterranean formation and/or the content of drilling fluids used during drilling operations.

One method and apparatus for estimating fluid properties is a two-port, transverse electromagnetic mode, coaxial waveguide flowline sensor as described in U.S. Pat. No. 5,677,631, which is hereby incorporated by reference.

There is a need for determining downhole fluid properties such as capacitance and conductance over an entire range of fluid properties from dry gas to saltwater.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is an apparatus for estimating a fluid property downhole. The apparatus includes a body having an elongated cavity defined by an electrically conductive inner surface and a central electrical conductor located coaxially within the cavity, wherein an annular region is defined by the cavity inner surface and an outer surface of the electrical conductor. The apparatus further includes a first electrode coupled to the central electrode, a second electrode coupled to the central electrode, and at least one intermediate electrode coupled to the central electrode between the first electrode and the second electrode, wherein an input signal applied to the central electrode and at least a first output signal emitted from the second electrode and a second output signal emitted from the at least one intermediate electrode are used in part to estimate the fluid property of a fluid existing in the annular region.

In one aspect, an apparatus includes a carrier that is transportable to a downhole well borehole location, a sensor body coupled to the carrier, the sensor body having an internal elongated cavity having an electrically conductive inner surface, an inflow fluid passageway for flowing a high-pressure fluid into the internal elongated cavity and an outflow fluid passageway for flowing high-pressure fluid from the internal elongated passageway. The apparatus according to this aspect further includes a central electrical conductor positioned coaxially in the internal elongated cavity such that fluid entering the elongated cavity flows within an annular space between the central electrical conductor and the electrically conductive wall, the central electrical conductor and electrically conductive wall forming a wave guide. A first electrically conductive electrode receives an electrical input signal from a transmitter, the first electrically conductive electrode being connected to a first end of the central electrical conductor. A second electrically conductive electrode emits a first return signal to a receiver, the second electrically conductive electrode being connected to a second end of the central electrical conductor; and at least one intermediate electrode that emits a second return signal to the receiver, the at least one intermediate lead being connected to the central electrical conductor between the first electrically conductive electrode and the second electrically conductive electrode, wherein the first return signal and second return signal are indicative of the fluid property.

In another aspect, a method for estimating a fluid property downhole includes carrying a sensor to a downhole location using a carrier, the sensor including a body having an elongated cavity defined by an electrically conductive inner surface, an central electrical conductor located coaxially within the cavity, wherein an annular region is defined by the cavity inner surface and an outer surface of the electrical conductor, a first electrode coupled to the central electrode, a second electrode coupled to the central electrode, and at least one intermediate electrode coupled to the central electrode between the first electrode and the second electrode. The method further includes flowing a fluid into the annular region, transmitting an input signal to the central electrode, emitting a first output signal from the second electrode, emitting a second output signal the at least one intermediate electrode, and using the emitted first output signal and the emitted second output signal in part to estimate the fluid property of the fluid existing in the annular region.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
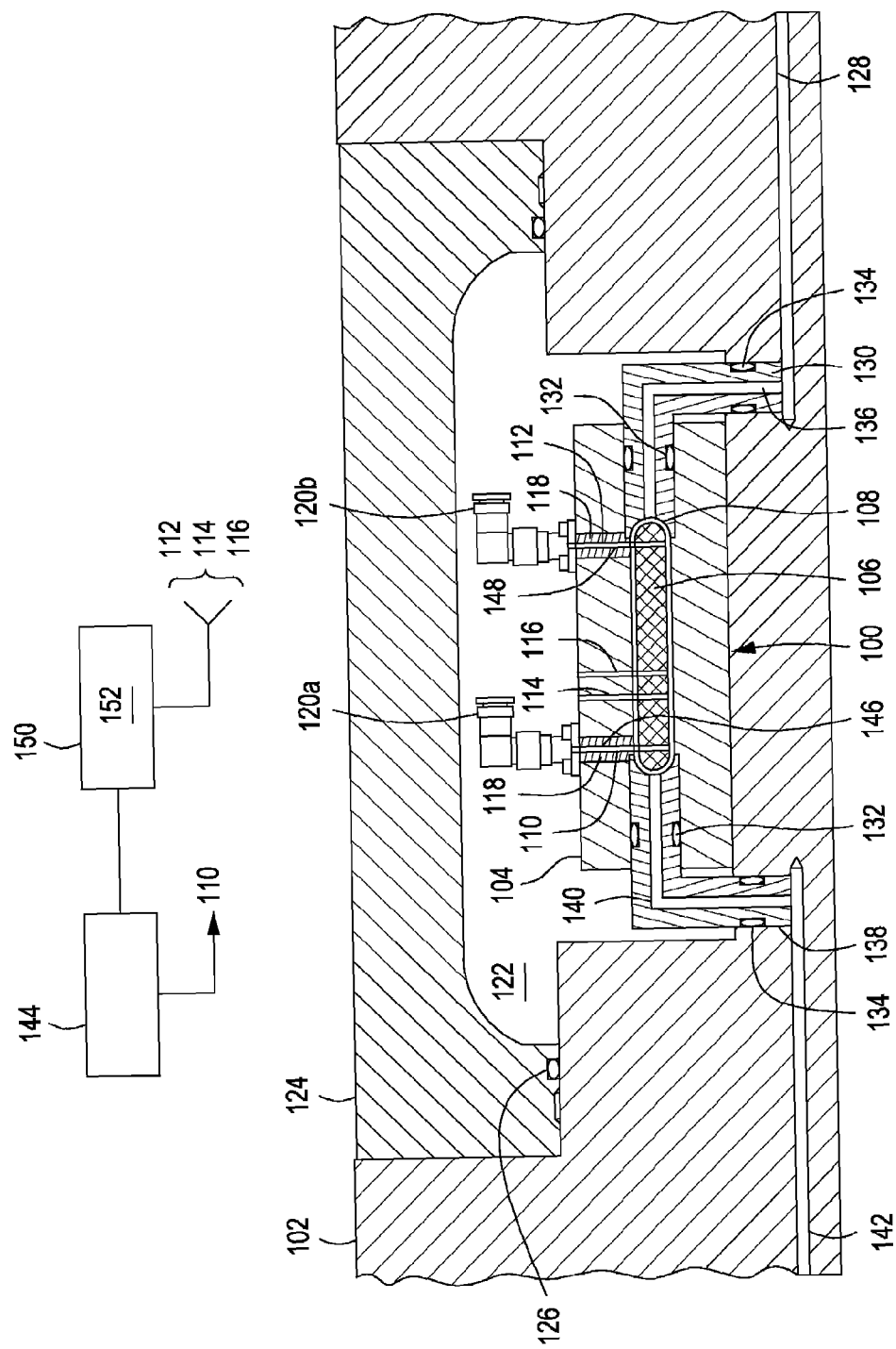
FIG. 1 illustrates a non-limiting example of a flowline sensor for estimating properties of a fluid downhole.

FIG. 1 illustrates a non-limiting example of a downhole fluid property sensor 100 according to the disclosure. In the example of FIG. 1, the sensor 100 is shown mounted on a carrier or tool body 102. The sensor 100 shown includes a sensor body 104 and an electrically conductive member referred to herein as a central conductor 106 that is disposed inside a sensor body cavity 108 that includes an electrically conductive inner wall. An annular volume is formed between an outer diameter of the central conductor 106 and the electrically conductive inner wall the sensor body cavity 108.

Several electrically conductive electrodes are coupled to the central conductor 106 and extend through the sensor body 104. In one non-limiting embodiment, the several electrodes include a transmitter electrode 110 electrically coupled to the central conductor 106 at or near one end of the central conductor 106 and a receiver electrode 112 electrically coupled to the central conductor 106 at or near a distal end of the central conductor 106. In several non-limiting embodiments, one or more intermediate electrodes 114, 116 are electrically coupled to the central conductor 106 between the transmitter electrode 110 and the receiver electrode 112. In several embodiments, an electric insulating material 118 is used to electrically isolate each electrode from the sensor body 104. Each electrode may be terminated inside a suitable electrical terminating device 120 such as a coaxial contact or other terminating device that allows for the connection of electrical leads that conduct signals to and/or from each electrode. It is not necessary that all terminating devices be of the same type.

In the non-limiting example of FIG. 1, the sensor body 104 is shown mounted inside an atmospheric cavity 122. The cavity 122 may be formed by machining a portion of the tool body 102 or by any other suitable method of forming an atmospheric cavity 122. In a downhole tool as disclosed, the atmospheric cavity 122 may be isolated from the wellbore with a suitable cover 124 and seal 126. The cavity volume may further be filled using a suitable potting material once all electrical connections to the terminations 120 are made.

The carrier 102 may include a fluid channel 128 that leads to a sensor inlet snorkel 130. Seals 132, 134 may be disposed between the inlet snorkel 130 and the sensor body 104 and the carrier 102, respectively. The inlet snorkel 130 includes an internal channel 136 that interfaces with the fluid channel 128 to provide a continuous channel from the carrier 102 to the sensor body cavity 108. An outlet snorkel 138 is coupled to the sensor body 104 and includes an inner channel 140 that leads from the sensor body cavity 108 to an exiting fluid channel 142. Seals 132 and 134 seal the interface between the outlet snorkel 138 and the sensor body 104 and the tool body 102, respectively.

In several non-limiting embodiments, the sensor 100 may be implemented downhole on a wireline or in a while-drilling configuration. The carrier 102 therefore, may be any number of downhole carriers such as a wireline cartridge or sonde, a bottom hole assembly (BHA), a drill-string or any other known carrier that is conveyable into a well borehole to traverse a subterranean formation. In other embodiments, the carrier may be a modular insert that may be detachably coupled to a wireline cartridge or sonde, a bottom hole assembly (BHA), or to a drill-string sub.

Still referring to FIG. 1, a radio frequency transmitter 144 may be used to generate a sensor signal that is transmitted via a coaxial cable connected to one of the sensor connectors 120a. In one embodiment, the connector 120a provides a standard 50 ohm RF connector to the waveguide flowline sensor 100. The connector 120a may be mounted on a small, rigid, feedthrough conductor 110 that is seated coaxially within a ceramic or other electrical insulator 118 filling a feedthrough tunnel 146 that leads to the sensor body cavity 108 of the sensor 100. The electrical insulator 118 may be used to form a high pressure seal between the feedthrough conductor and the body of the sensor 100. The feedthrough conductor and the walls of the tunnel 146 form a coaxial feedthrough waveguide that provides a signal path between the connector 120a, and the central conductor 106 suspended coaxially within the sensor body cavity 108 by the feedthrough conductor.

In the non-limiting example shown, a second rigid coaxial electrical feedthrough conductor 112 may be attached to an opposite end of the central conductor 106. The second conductor 112 may extend through a feedthrough tunnel 148 to another of the connectors 120b. The feedthrough conductor 112 is coaxially seated within a ceramic electrical insulator 112 that fills the tunnel 148 to form a feedthrough waveguide which provides a signal path between the waveguide flowline cavity 108 and the output connector 120b.

The central conductor 106 and the walls of the flowline cavity 108 form a TEM mode waveguide, which is referred to herein as the flowline waveguide and is distinguished from the feedthrough waveguides. The output connector 120b provides an output signal to a coaxial cable connected to a receiver 150. The receiver 150 may also receive a calibration signal and a reference signal from the transmitter 144. In one embodiment, the receiver 150 includes a processor 152 for processing received signals. The processed signals may be an estimate of desired fluid properties or the processed signals may be used to estimate desired properties of fluid in the sensor 100. In several other non-limiting embodiments, the processor may be located in the transmitter 144, in another location that is on the carrier 102 or on the wireline or drill string, or the processor 152 may be located at a surface location.

In several non-limiting embodiments, intermediate conductors 114, 116 are connected to the central conductor 106 and pass through insulated feedthrough tunnels in substantially the same manner as the transmitter conductor 110 and the receiver conductor 112 described above. For brevity, mechanical details and connectors 120 are not shown here for the additional intermediate conductors. These aspects may be implemented by those skilled in the art with the benefit of this disclosure without additional illustration or extended discussion. The output of each intermediate conductor 114, 116 is conveyed to the receiver 150 substantially as described with respect to the receiver conductor 112 discussed above. In other particular embodiments, more measuring electrodes may be included and two or more switching transmitters may be used to generate the input signal. In one particular embodiment, at least three intermediate electrodes are used to provide additional measurements along the central conductor. Furthermore, the receiver may include a single multiplexed channel for receiving each sensor output signal, or a multi-channel receiver may be used.

Figure 2:
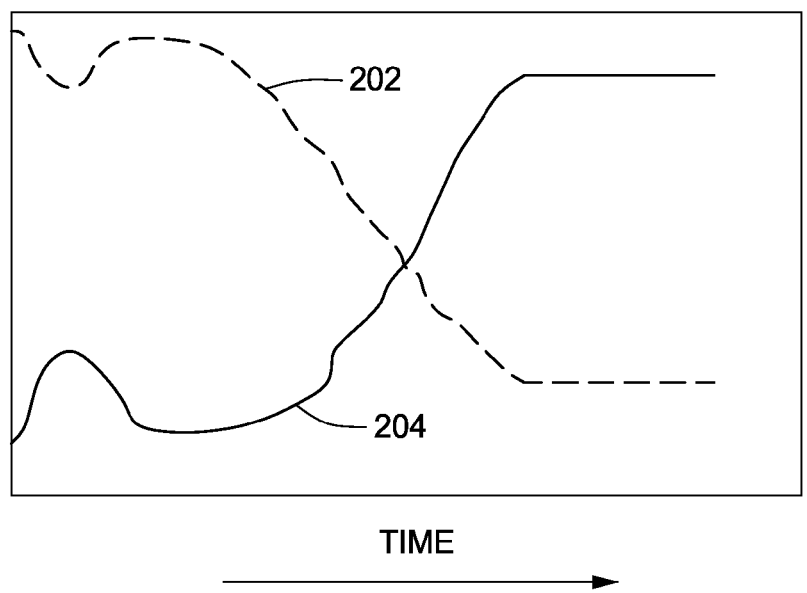
FIG. 2 is a plot of selected fluid properties with respect to time during a clean-up process.

Now that several non-limiting structural aspects of the sensor 100 have been described, operational aspects of the disclosure may be discussed. FIG. 2 illustrates typical output signals from a Resistivity-Capacitance (RC) sensor during a clean-up process for a downhole fluid sample. Dashed plot line 202 illustrates capacitance of a sampled fluid transitioning over time from water to hydrocarbon and solid plot line 204 illustrates resistivity of the fluid transitioning from water to hydrocarbon. As shown, a high water content fluid sample exhibits high capacitance and low resistivity transitioning to a hydrocarbon fluid sample exhibiting low capacitance and high resistivity. There exists a wide range of resistivity of fluids that can be encountered by a formation testing tool. The present disclosure includes a downhole fluid sensor 100 incorporating a high resolution capacitance sensor and a conductivity sensor with a wide dynamic range into a single sensor package.

Several sensor embodiments, such as the embodiment described above and shown in FIG. 1, may be used to determine the resistivity and capacitance of a fluid by measuring the attenuation and phase shift of a high frequency electromagnetic wave propagating through the fluid. In one non-limiting example, the sensor 100 is constructed in a coaxial arrangement of conductors with a volume between the conductors being filled with the fluid sample being measured. The sensor 100 acts as an electromagnetic signal transmission line with the fluid between the conductors changing the conductance and capacitance between the conductors formed by the central conductor 106 and an inner conductive wall of the sensor body cavity 108.

The conductance per unit length of the sensor coaxial conductors is inversely proportional to the resistivity of the fluid between the coaxial conductors of the sensor. The capacitance per unit length is directly proportional to the dielectric constant of the fluid between the conductors. Both the conductance and capacitance are inversely proportional to the logarithm of the ratio of the inner diameter (I.D) of the sensor body inner wall forming the outer conductor to the outer diameter (O.D.) of the central conductor 106 forming the inner conductor of the coaxial transmission line. As this conductance or capacitance increases, the attenuation and phase shift of signal in the form of an electromagnetic wave propagating through the transmission line increases. Another factor that affects the range and resolution of the sensor is the impedance mismatch between the sensor and cables connecting it to the electronics making the measurement. The effect of these impedance mismatches is covered in detail in U.S. Pat. No. 5,677,631 incorporated herein by reference. To increase the resolution of the capacitance measurement the ratio of the conductor diameters may be minimized and the length of the conductors increased so long as adequate fluid flow through the formation tester sample line is maintained. The measurable conductivity range may be increased by measuring attenuation differentially to negate the attenuation due to the impedance mismatches and by decreasing the length of the conductors. This example may be shown schematically as a transmission line.

Figure 3:
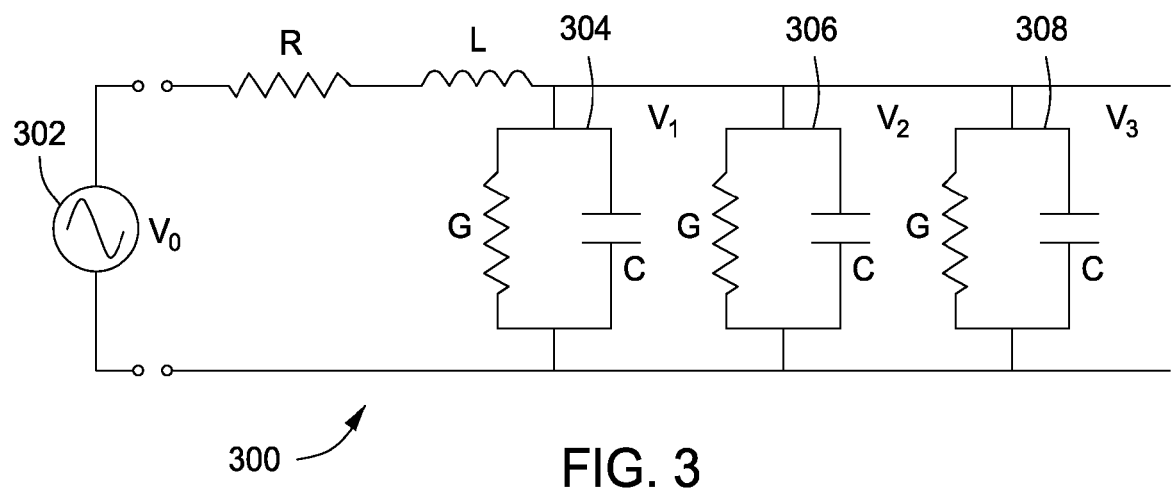
FIG. 3 schematically represents the electrical characteristics of a flowline sensor according to FIG. 1.

FIG. 3 illustrates an example of the resulting transmission line 300 having four ports allowing for a single ended capacitance measurement ($V_3/V_0$) and a differential conductivity measurement ($V_2/V_0-V_1/V_0$). The transmission line 300 is connected to a signal source 302, and the structural components of the sensor 100 may be electrically represented by a characteristic resistance R of the conductors and a characteristic inductance L of the coaxial conductors. The particular value of R and L are determined by the particular size and materials of construction used for the sensor 100. Furthermore, R and L may be considered as values per unit length.

The electrical characteristics of the annular space between the coaxial conductors may be schematically represented as a characteristic capacitance C and a characteristic conductance G. For each of the intermediate conductors 114, 116 a parallel conductance/capacitor circuit 304, 306 may be used to represent the effect of the fluid on the input signal Vo at the location of the particular conductor. Likewise, the receiver conductor 112 position may be represented by a similar G-C circuit 308. Those skilled in the art with the benefit of the present disclosure will understand that additional sensor conductors may be added and may be represented by similar G-C circuits.

In operation, referring now to FIGS. 1 and 3, fluid being tested flows to the sensor 100 via the fluid inflow channel 128 leading to the sensor inlet snorkel 130. The fluid flows into the sensor body cavity 108 via the inlet snorkel internal channel 136. The transmitter generates an RF input signal $V_0$, which is transmitted to the signal input (transmitter) lead 110. The receiver 150 receives a signal $V_3$ from the end lead 112, and the receiver receives a separate signal from each on the intermediate leads; in this case $V_1$ from one intermediate lead 114 and $V_2$ from the second intermediate lead 116. A differential voltage signal $V_{diff}$ is generated by integrated or discrete electronic differential circuits, or $V_{diff}$ may be generated using the processor 152. Again, using the processor 152 or other circuits, a single ended capacitance measurement ($V_3/V_0$) may be used to estimate capacitance of fluid in the sensor 100 and a differential conductivity measurement ($V_2/V_0-V_1/V_0$) may be used to estimate the conductance of the fluid in the sensor.

The measurements may be made on single or multi-phase fluids. In several embodiments, the fluid may be drilling fluid, well bore fluid, pristine formation fluid or any combination of fluids. The sensor 100 may be operated with fluid substantially stationary in the sensor cavity or the fluid may be flowing through the sensor 100. In one embodiment, the input signal is a sweep signal that covers substantially the entire range of downhole fluid properties from dry gas to saltwater. In one example, the entire range of fluid properties is measured using a single input sweep.

Fluid may be expelled from the sensor 100 using the outlet snorkel inner channel 140 that leads from the sensor body cavity 108 to the exiting fluid channel 142. The fluid may be conveyed to a sampling chamber (not shown) for retrieval at the surface, or the fluid may be expelled into the well borehole.

Figure 4:
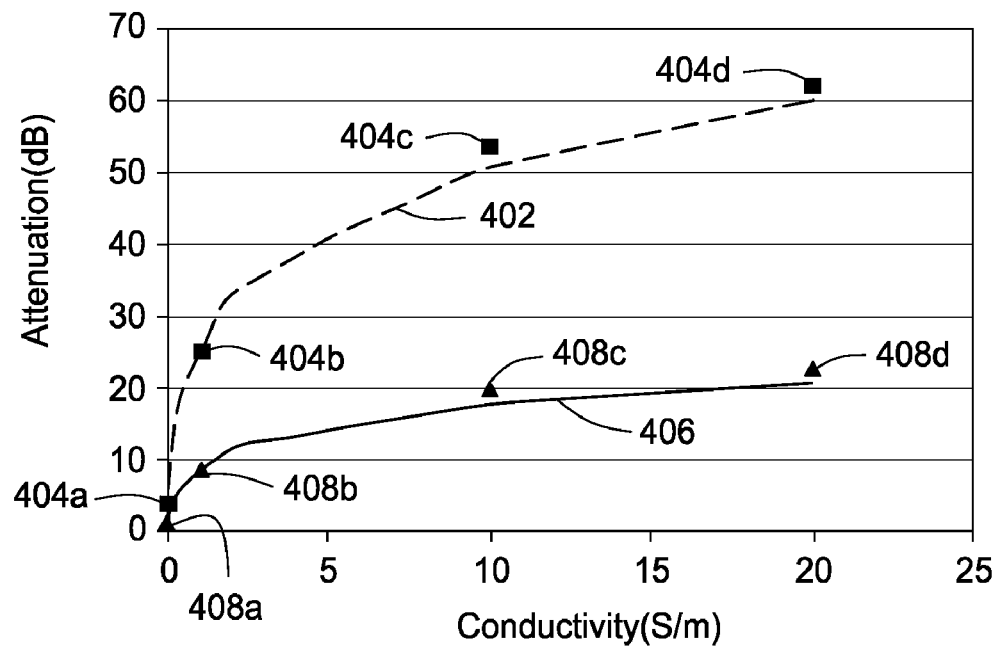
FIG. 4 is a fluid property plot comparing a two-port flowline sensor to a sensor according to the present disclosure.

FIG. 4 shows attenuation vs. conductivity plots comparing the non-limiting sensor example of FIG. 1 to a typical two-port sensor. A two port sensor model is represented by dashed line 402 with measured values shown as discrete points 404a, 404b, 404c, and 404d. By comparison, a model of the differential sensor shown as a solid line 406 with discrete measured values shown at 408a, 408b, 408c, and 408d that show decreased attenuation over the same range of fluid conductivity for the two-port sensor. In conductive fluids the differential measurement has significantly less attenuation of the signal being measured as shown in FIG. 4. As a consequence it is possible to measure fluids of higher conductivity.

Figure 5:
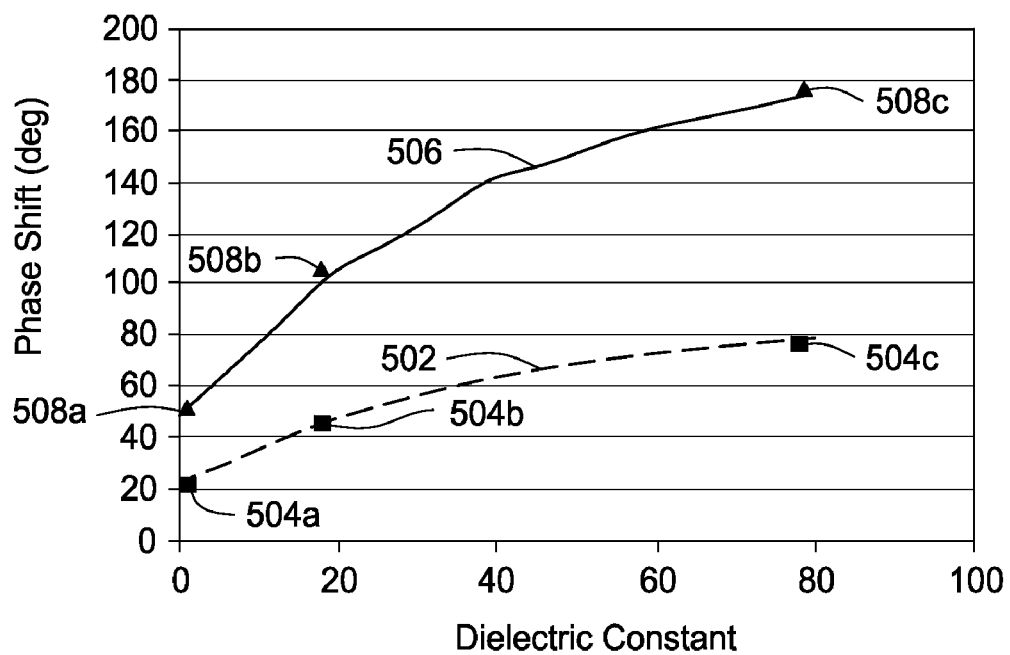
FIG. 5 is another fluid property plot comparing a two-port flowline sensor to a sensor according to the present disclosure.

FIG. 5 shows phase shift in degrees vs. dielectric constant plots comparing the non-limiting sensor example of FIG. 1 to a typical two-port sensor. A two port sensor model is represented by dashed line 502 with measured values shown as discrete points 504a, 504b, and 504c. By comparison, a model of the differential sensor shown as a solid line 506 with discrete measured values shown at 508a, 508b, and 508c. The comparison shows an increased phase shift over the same range of fluid dielectric constant. In nonconductive fluids the reduced diameter ratio and increased length of the disclosed sensor causes the phase shift due to the dielectric constant of the fluid to increase as shown in the figure. With a larger phase shift it is possible to resolve smaller changes in dielectric constant.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

What is claimed is:

1. An apparatus for estimating a fluid property downhole, the apparatus comprising:

a body having an elongated cavity defined by an electrically conductive inner surface;

a central electrical conductor located coaxially within the cavity, wherein an annular region is defined by the cavity inner surface and an outer surface of the electrical conductor;

a first electrode coupled to the central electrode;

a second electrode coupled to the central electrode; and at least one intermediate electrode coupled to the central electrode between the first electrode and the second electrode, wherein an input signal applied to the central electrode and at least a first output signal emitted from the second electrode and a second output signal emitted from the at least one intermediate electrode are used in part to estimate the fluid property of a fluid existing in the annular region.

2. An apparatus according to claim 1, wherein the input signal comprises a sweep signal.

3. An apparatus according to claim 1, wherein the input signal comprises a sinusoidal signal.

4. An apparatus according to claim 1, wherein the input signal comprises a radio frequency signal.

5. An apparatus according to claim 1, wherein the estimated fluid property comprises fluid conductivity.

6. An apparatus according to claim 1, wherein the estimated fluid property comprises fluid dielectric constant.

7. An apparatus according to claim 1, wherein the at least one intermediate electrode comprises at least two intermediate electrodes.

8. An apparatus according to claim 1, wherein the at least one intermediate electrode comprises at least three intermediate electrodes.

9. An apparatus according to claim 1 further comprising a transmitter that transmits the input signal to the central conductor.

10. An apparatus according to claim 9, wherein the transmitter comprises two switching transmitters.

11. An apparatus according to claim 1 further comprising receiver that receives the first output signal and the second output signal.

12. An apparatus according to claim 11, wherein the receiver comprises a plurality of receiving channels, each of the plurality of receiving channels receiving an output signal.

13. An apparatus according to claim 11, wherein the receiver comprises a multiplexed receiving channel for receiving the first output signal and the second output signal.

14. An apparatus for estimating a fluid property downhole, the apparatus comprising:

a carrier that is transportable to a downwhole well borehole location;

a sensor body coupled to the carrier, the sensor body having an internal elongated cavity having an electrically conductive inner surface, an inflow fluid passageway for flowing a high-pressure fluid into the internal elongated cavity and an outflow fluid passageway for flowing high-pressure fluid from the internal elongated passageway;

a central electrical conductor positioned coaxially in the internal elongated cavity such that fluid entering the elongated cavity flows within an annular space between the central electrical conductor and the electrically conductive wall, the central electrical conductor and electrically conductive wall forming a wave guide;

a first electrically conductive electrode that receives an electrical input signal from a transmitter, the first electrically conductive electrode being connected to a first end of the central electrical conductor;

a second electrically conductive electrode that emits a first return signal to a receiver, the second electrically conductive electrode being connected to a second end of the central electrical conductor; and at least one intermediate electrode that emits a second return signal to the receiver, the at least one intermediate lead being connected to the central electrical conductor between the first electrically conductive electrode and the second electrically conductive electrode, wherein the first return signal and second return signal are indicative of the fluid property.

15. An apparatus according to claim 14, wherein the intermediate electrode comprises at least two intermediate electrodes.

16. An apparatus according to claim 14, wherein the intermediate electrode comprises at least three intermediate electrodes.

17. A method for estimating a fluid property downhole, the method comprising:

carrying a sensor to a downhole location using a carrier, the sensor including a body having an elongated cavity defined by an electrically conductive inner surface, an central electrical conductor located coaxially within the cavity, wherein an annular region is defined by the cavity inner surface and an outer surface of the electrical conductor, a first electrode coupled to the central electrode, a second electrode coupled to the central electrode, and at least one intermediate electrode coupled to the central electrode between the first electrode and the second electrode;

flowing a fluid into the annular region;

transmitting an input signal to the central electrode;

emitting a first output signal from the second electrode;

emitting a second output signal from the at least one intermediate electrode; and using the emitted first output signal and the emitted second output signal in part to estimate the fluid property of the fluid existing in the annular region.

18. A method according to claim 17, further comprising transmitting the input signal to the central conductor using a transmitter.

19. A method according to claim 17, wherein the input signal comprises one or more of a sweep signal, a sinusoidal signal, and a radio frequency signal.

20. A method according to claim 17, wherein the estimated fluid property comprises at least one of fluid conductivity and fluid dielectric constant.

21. A method according to claim 17, wherein the at least one intermediate electrode comprises at least two intermediate electrodes, the method further comprising determining a differential signal from output signals emitted by each of the at least two intermediate electrodes.

* * * * *